United States Patent [19]

Hardin

[11] Patent Number: 4,465,519

[45] Date of Patent: Aug. 14, 1984

[54] DRY MORTAR MIX WITH ADHESIVE

[76] Inventor: George E. Hardin, 206 E. 4th St., Bloomington, Ind. 47401

[21] Appl. No.: 507,672

[22] Filed: Jun. 24, 1983

Related U.S. Application Data

[63] Continuation-in-part of Ser. No. 189,748, Sep. 23, 1980, Pat. No. 4,390,372.

[51] Int. Cl.³ ............................................... C04B 7/351
[52] U.S. Cl. ..................................... 106/91; 106/314
[58] Field of Search ................................... 106/91, 314

[56] References Cited

U.S. PATENT DOCUMENTS

| | | | |
|---|---|---|---|
| 3,196,122 | 7/1965 | Evans | 260/42.13 |
| 3,256,229 | 6/1966 | Janota et al. | 260/42.13 |
| 3,538,036 | 11/1970 | Peters et al. | 106/90 |
| 3,850,651 | 11/1974 | Duncan et al. | 106/90 |
| 3,955,992 | 5/1976 | Roberts | 106/90 |
| 3,972,723 | 8/1976 | Balle et al. | 106/97 |
| 4,118,242 | 10/1978 | Kjohl et al. | 106/98 |
| 4,137,088 | 1/1979 | Debus et al. | 106/90 |
| 4,164,426 | 8/1979 | Sinka et al. | 106/90 |
| 4,224,076 | 9/1980 | Moitra et al. | 106/97 |
| 4,263,191 | 4/1981 | Eck et al. | 106/90 |

Primary Examiner—James Poer
Attorney, Agent, or Firm—Harvey B. Jacobson

[57] ABSTRACT

A novel multi-purpose dry mortar composition comprises Portland cement, fine grained stone or marble flour, a surfactant and a dry adhesive pre-mixed in dry form which can be bagged along with masonry sand at the plant or water and masonry sand can be added at the job site to form one coat or base coat finishes for interior and exterior use.

4 Claims, No Drawings

DRY MORTAR MIX WITH ADHESIVE

CROSS-REFERENCE TO RELATED APPLICATION

This application is a continuation-in-part of my co-pending application, Ser. No. 189,748, filed Sept. 23, 1980, for DRY PRE-MIXED MORTAR, now U.S. Pat. No. 4,390,372.

BACKGROUND OF THE INVENTION

1. Field of the Invention

This invention relates to mortar compositions, and more particularly to a dry mix mortar composition which can be utilized for a variety of purposes for both interior and exterior use.

2. Description of the Prior Art

Mortar additives used to modify the concrete to make it more suitable for the work at hand, to gain some economic advantage or to modify the cement for particular application in a manner which would be impossible without the use of the additive are well known. For example, it is common practice to incorporate certain additives into cement compositions to accelerate or increase strength development, retard or accelerate initial set, inhibit corrosion of metals imbedded in the cement, as well as many other desired effects. Some additives are known to effect more than one property of concrete and, commonly, will beneficially effect one property to the detriment of another.

Certain organic compounds, such as organic surfactants, have been commonly used as water reducing agents and have been applied in both liquid and powder form. Such commonly used surfactants include the aryl and alkyl aryl sulfonates. The following listed U.S. patents each disclose the addition of surfactants into cement compositions or other additives or compositions:

| U.S. Pat. Nos | Issued | Inventors |
| --- | --- | --- |
| 3,196,122 | 7-20-65 | Evans |
| 3,256,229 | 6-4-66 | Janota et al |
| 3,538,036 | 11-3-70 | Peters et al |
| 3,607,326 | 9-21-71 | Serafin |
| 3,850,651 | 11-26-74 | Duncan et al |
| 3,955,992 | 5-11-76 | Roberts |
| 3,972,723 | 8-3-76 | Balle' et al |
| 4,080,217 | 3-21-78 | Falcoz et al |
| 4,118,242 | 10-3-78 | Kjohl et al |
| 4,137,088 | 1-30-79 | Debus et al |
| 4,164,426 | 8-14-79 | Sinka et al |
| 4,205,993 | 6-3-80 | Rosenberg et al |
| 4,209,336 | 6-24-80 | Previte |
| 4,224,076 | 9-23-80 | Moitra et al |
| 4,263,191 | 4-21-81 | Eck et al |

In U.S. Pat. No. 3,869,051, issued Oct. 30, 1973 to the present inventor, a liquid additive for mortar is disclosed which is able to retard the setting and increase the workability of mortars. This additive is in liquid form and is to be added to the cement and masonry sand at the job site with the correct amount of water. However, it is difficult for the users of the mortar to mix the correct amounts of water and liquid additive therein to provide for the improved results. Accordingly, the improved results which are realized by adding the appropriate amounts of liquid additive according to the teachings of the patent find only a moderate and uneven success during actual application on the job site.

In spite of the fact that numerous mortar additives have been proposed, a need still exists for a mortar composition which can be used for a varfiety of purposes and which can include a surfactant and adhesive per-mixed in dry form to the proper consistency before the water and sand if not pre-mixed are included at the job site.

SUMMARY OF THE INVENTION

In accordance with the present invention, a hydraulic mortar composition which can be used for a variety of purposes such as a high P.S.I. mortar, a finish stucco and plaster for interior and exterior surfaces, a one application spackling and drywall compound, swimming pool martars, base and finish coats, roof coatings, patching and topping compounds, masonry mortars, exposed aggregate, stucco stone and brick for roofing tile manufacturing, lightweight floors and decking, ceramic tile cement and terrazzo mortar. The mortar composition of the present invention can be formulated for application by hand troweling, gun and roll-on finishes with the mortar including high tensile and flexural strength and excellent bonding properties.

Briefly, the mortar composition of the present invention comprises about 15% to about 75% of a hydraulic cement, such as Portland cement, about 25% to 85% of a stone or marble flour and about 5 grams to no more than about 60 grams of a surfactant per 100 pounds of the dry mortar mix and ½ to 20 pounds of dry adhesive in the form of a collagen protein per 100 pounds of dry mortar mix.

These ingredients are pre-mixed in dry form and packaged. At the job site, additional masonry sand and water can be added. Optionally, at the plant, sand can be bagged with and mixed with the ingredients so that only water need to added at the job site.

An object of the present invention is to provide a mortar composition which can be utilized for a variety of purposes without substantial changes to the hydraulic binder mix.

Another object of the present invention is to provide a hydraulic binder which is pre-mixed in the dry state eliminating on-the-site additions to the pre-mix mortar.

Still another object of the present invention is to provide a dry pre-mix hydraulic binder containing a surfactant.

These together with other objects and advantages which will become subsequently apparent reside in the details of the formulations and uses as more fully hereinafter described and claimed.

DETAILED DESCRIPTION OF THE INVENTION

The mortar composition comprises a dry pre-mixed mortar including a hydraulic binder, a fine grained stone or marble, a surfactant additive and a dry adhesive. The components are mixed thoroughly in the dry state and then packaged in 75, 80, and 100 pound bags for delivery to the job site, whereupon the conventional masonry sand and water can be included and mixed before use. Alternatively, the masonry sand can be added at the plant and bagged with the other ingredients.

The hydraulic binder used is preferably Portland cement of which any type may be used including the white and grey varieties. The hydraulic binder is present in amounts of at least 15% and up to 75% by weight of the dry mix. Preferably, the hydraulic binder will be present in amounts between 40% and 60% by weight.

The fine grained stone and marble addition to the dry mix are characterized as stone or marble flours conventionally of 200 mesh or smaller, but can be as large as 50 mesh, if desired.

The surfactant which is added can be one of many conventional surfactants which are utilized to reduce the amount of water needed in order to bring the hydraulic binder to an easily workable fluid form. One preferred surfactant consists of a sodium salt of an alkyl aryl sulfonate, such as sodium dodecylbenzene sulfonate. The surfactant is conventionally added to only small amounts of the hydraulic binder. In accordance with the present invention, the surfactant can be added in amounts of up to about 5 to 60 grams per 100 pounds of the dry mix mortar. Preferably, the surfactant is added in amounts of about 5 to 40 grams per hundred pounds of dry mix.

The dry adhesive in the form of a collagen protein (protein of animal skin) having a molecular weight of about 100,000 and is similar to commercially available animal gelatin. The adhesive may pass through a #8 to #20 mesh and is in fine particulate form. Preferably, the adhesive is a by-product collected in the dust collecting system during the grinding process in the plant in wich gelatin is formed.

The following Examples are included to more specifically set forth exemplary mortar compositions produced in accordance with the present invention and exemplary modes of utilizing same.

EXAMPLE I

| Portland Cement | 40 lbs. |
| --- | --- |
| Marble Flour | 40 lbs. |
| Calsoft F-90* | 14 grams. |
| Collagen Protein | ½ lbs. |

*Calsoft F-90 is a sodium dodecylbenzene sulfonate from Pilot Chemical Company, Cincinnati, Ohio.

For one coat finished plaster, stucco, spackling compound, pool finish coats, stucco stone and roof coating, an additional 80 lbs. of masonry sand can be added at the job site.

The above-mentioned formula bonds to painted and unpainted masonry surfaces without using wire or metal lathe.

EXAMPLE II

| Portland Cement | 50 lbs. |
| --- | --- |
| Stone or Marble Flour | 50 lbs. |
| Calsoft F-90* | 14 grams. |
| Collagen Protein | 2 lbs. |

*Calsoft F-90 is a sodium dodecylbenzene sulfonate from Pilot Chemical Company, Cincinnati, Ohio.

Add at job site up to 100 pounds of masonry sand.

EXAMPLE III

| Portland Cement | 40 lbs. |
| --- | --- |
| Stone, Marble or Granite Flour | 60 lbs. |
| Calsoft F-90* | 12 grams. |
| Collagen Protein | 2 lbs. |

*Calsoft F-90 is a sodium dodecylbenzene sulfonate from Pilot Chemical Company, Cincinnati, Ohio.

Add at job site up to 90 pounds of masonry sand.

EXAMPLE IV

| Portland Cement | 40 lbs. |
| --- | --- |
| Stone or Marble Flour | 30 lbs. |
| Calsoft F-90* | 12 grams. |
| Collagen Protein | 2 lbs. |

*Calsoft F-90 is a sodium dodecylbenzene sulfonate from Pilot Chemical Company, Cincinnati, Ohio.

Up to 90 pounds of masonry sand can be added at the job site.

EXAMPLE V

| Portland Cement | 45 lbs. |
| --- | --- |
| Calsoft F-90* | 14 grams. |
| Collagen Protein | 2 lbs. |

*Calsoft F-90 is a sodium dodecylbenzene sulfonate from Pilot Chemical Company, Cincinnati, Ohio.

Up to 80 pounds of masonry sand can be added at the job site.

EXAMPLE VI

| Portland Cement | 55 lbs. |
| --- | --- |
| Marble Flour | 45 lbs. |
| Calsoft F-90 | 35 grams. |
| Collagen Protein | 2 lbs. |

At the job site up to 200 pounds of masonry sand can be added, depending upon how fine or coarse the sand. Alternatively, the sand may be added at the plant and bagged along with the other dry ingredients.

EXAMPLE VII

| Portland Cement | 55 lbs. |
| --- | --- |
| Marble Flour | 45 lbs. |
| Calsoft F-90 | 40 grams |
| Collagen Protein | 4 lbs. |

This formulation will have about 200 pounds of fine sand added thereto and the surfactant may have a defoaming agent added.

EXAMPLE VIII

| Portland Cement | 55 lbs. |
| --- | --- |
| Stone or Marble Flour | 45 lbs. |
| Surfactant | 40 grams. |
| Collagen Protein | 20 lbs. |

About 200 pounds of masonry sand is added to this formulation at the plant or on the job site.

In the above Examples, the mortar is to be applied by troweling by hand. All mortars to be gunned or pumped are the same as the mixes in the previous Examples except a powder antifoaming agent is added to the dry mix before packaging which reduces the air in the mortars, causing the mortar to flow through the pumps more evenly. Antifoaming agents come in powder form. An example of a typical formulation comprises 1 to 3 oz. per 100 lbs. of dry mix. Antifoam Q 2-3000 Dow Corning Corp., Midland, Mich., has proven successful.

The mortar compositions in accordance with the present invention reach a higher P.S.I. and have been found to have better bonding power, less shrinkage, more plasticity and greater tensile and flexural strength than prior art mortars. Substantially all blistering and cracking are eliminated. The mortars spread easily for efficient application. The mortars are lightweight and substantially waterproof. The mortar compositions of the present invention do not include asbestos nor do the mixes require the addition of lime, but instead utilize the finely grained marble and stone flour. This mortar bonds to painted and unpainted masonry surfaces, will adhere directly to gypsum board (dry wall) without prior treatment, bonds new mortar to old mortar, exposed aggregate and terrazzo mortars, patching and topping mortars, stucco, masonry mortars and other uses for mortar.

While the present invention has been described with respect to particular embodiments thereof, it will be appreciated that numerous modifications may be made by those skilled in the art without actually departing from the scope of the invention.

What is claimed as new is as follows:

1. A dry mix multi-purpose mortar composition comprising: 40% to 60% by weight Portland cement, 25% to 85% by weight finely divided stone, 5 to 60 grams of a surfactant per 100 pounds of dry mix, said finely divided stone having a particle size of between 50 mesh and 200 mesh and selected from the group consisting of marble flour, granite flour, stone flour and fine sand and ½ lb. to 20 lb. of collagen protein in dry form per 100 lbs. of cement, filler and surfactant.

2. A dry mortar mix comprising 55 lbs. of Portland cement, 45 lbs. of marble flour or fine stone, about 35 grams of surfactant and about 2 lbs. of collagen protein in dry form per 100 lbs. of dry mix, said marble flour or fine stone or mixtures thereof having a particle size between 50 mesh and 200 mesh.

3. The dry mortar mix of claim 2 wherein 4 lbs. of collagen protein is adder per 100 lbs. of dry mix.

4. The dry mortar mix of claim 2 wherein 20 lbs. of collagen protein is added per 100 lbs. of dry mix.

* * * * *